July 22, 1947.  J. H. BOOTH  2,424,431
JOINT
Filed Oct. 16, 1944
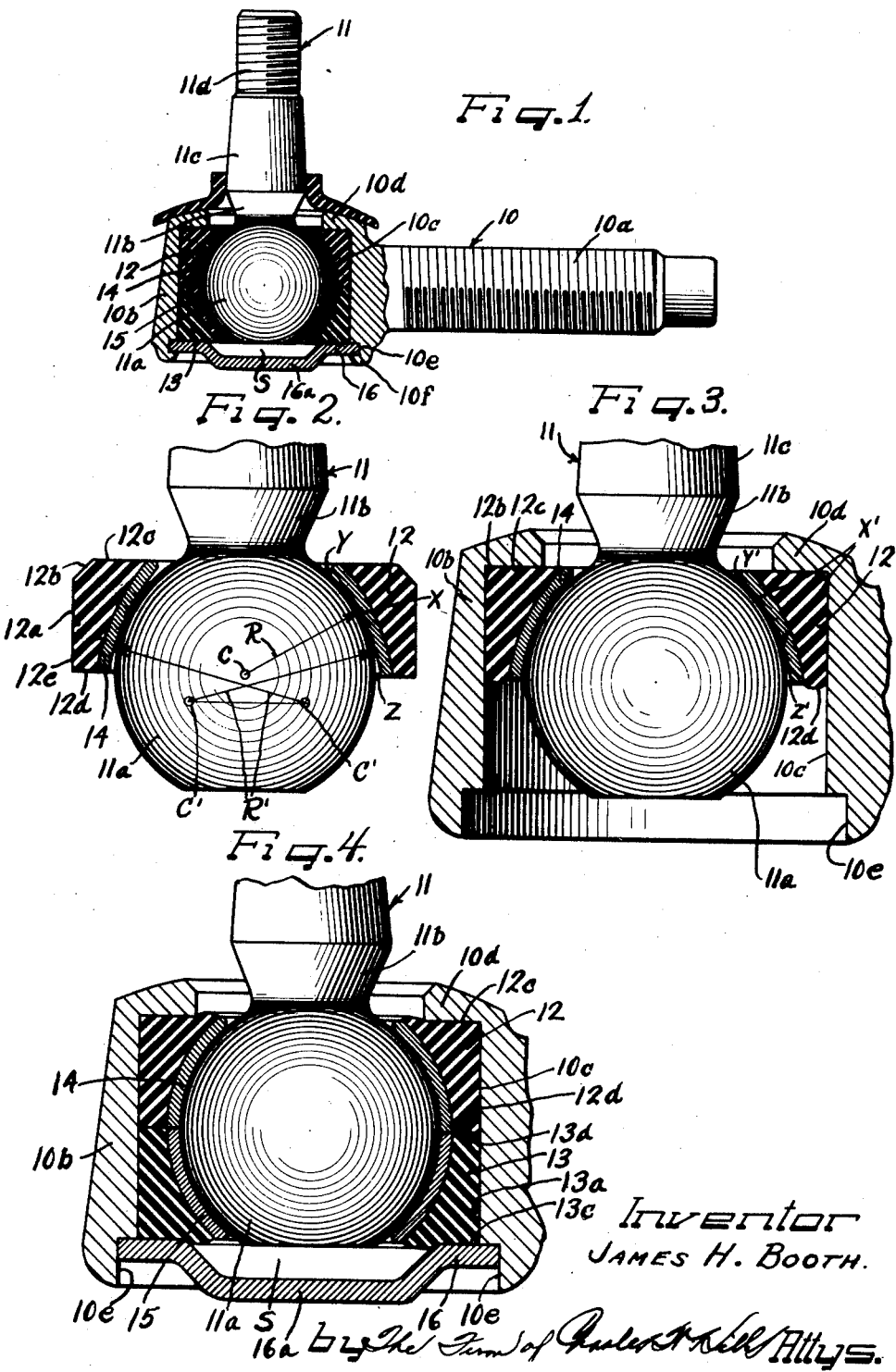
Inventor
JAMES H. BOOTH.

Patented July 22, 1947

2,424,431

UNITED STATES PATENT OFFICE 2,424,431

JOINT

James H. Booth, Detroit, Mich., assignor to Thompson Products, Inc., Cleveland, Ohio, a corporation of Ohio Application October 16, 1944, Serial No. 558,834

6 Claims. (Cl. 287—85)

This invention relates to joint assemblies, such as tie rod joints, wherein deformable bushings are so shaped that they will provide for good bearing contact throughout a wide range of tolerance limits.

Specifically, the invention relates to ball and socket joints having rubber rings carrying cup-shaped liners which cooperate when the rings are loaded to define a ball socket, but which, in their free, unloaded state, have a toroidal contour.

In accordance with this invention a ball ended stud is tiltably and rotatably mounted by providing a socket for the ball end thereof which is deformed under load from a non-spherical to a spherical shape. The socket, in its free state, therefore, need not be held to such close tolerance limits as would be necessary if the socket had a true spherical shape in its free state.

The socket is composed of opposed rubber rings each having a recess lined with deformable material which defines the ball seat. The deformable material is preferably composed of synthetic resin-impregnated fabric vulcanized directly to the rubber. The resin-impregnated fabric provides an excellent bearing surface for the ball end of the stud and still can be sufficiently deformed to assume a true spherical shape when the rubber is placed under load in the housing for the joint. The loaded rubber constantly urges the liner into full bearing engagement with the ball end of the stud and, as wear progresses, the good bearing relationship is maintained because the loaded rubber will compensate for wear.

It is preferred that the ball end of the stud initially only have a ring contact with each liner. This ring contact is changed to a band area contact when each rubber ring of the bushing is radially loaded in the housing of the joint. The band contacts are then increased to full contact with the ball end of the stud when the rubber rings are axially loaded in the housing of the joint. The resulting loaded assembly is thus under radial and axial load with the radial load causing annular band contact between the liners and ball end of the stud, and the axial load causing the band contacts to be increased to full contact. The band contact areas are under somewhat heavier load than the remaining contact areas on each side of the band areas. As a result of this increased load, wear of the free ends of the liner is minimized, and any dirt entering between the liner and ball end of the stud is held against further entry into the liner to interfere with the band contact areas.

A feature of the invention, therefore, resides in the provision of deformable sockets for joints which, in their free state, have contours other than those assumed in operation under load, so that permissible tolerance limits are greatly increased.

An object of the invention is to provide joint assemblies which can be manufactured under wide tolerance limits and still have excellent bearing characteristics when assembled under load.

A still further object of the invention is to provide a ball and socket joint with an axially and radially loaded socket deformed from its free state into good bearing contact with the ball.

A still further object of the invention is to provide a rubber bushed ball and socket joint with deformable socket walls held in deformed condition by the rubber bushing.

A further object of the invention is to provide a ball and socket tie rod joint with a deformable plastic material socket vulcanized to resilient material which deforms the socket under load from a toroidal shape to a true spherical shape.

A still further object of the invention is to provide a rubber bushed ball and socket joint wherein the socket is composed of synthetic resin impregnated fabric which is held under load against the ball to assume a true spherical shape.

Other and further objects of the invention will be apparent to those skilled in the art from the following detailed description of the annexed sheet of drawings which, by way of preferred example only, illustrates one embodiment of the invention.

On the drawings:

Figure 1 is a side elevational view, with parts broken away and shown in vertical cross section, of a ball and socket tie rod joint according to this invention.

Figure 2 is an enlarged and exaggerated fragmentary side elevational view, with parts in vertical cross-section, of the ball stud and one of the socket rings for the joint of Figure 1, illustrating the initial ring line contact between the ball and socket when the socket is in its free state.

Figure 3 is a view similar to Figure 2, but illustrating the socket in a radially loaded condition in the joint housing, to show the increase in contact between the ball and socket.

Figure 4 is a view similar to Figure 3, but illustrating the second socket ring in position in the joint housing and under axial load to show the full bearing engagement between the socket and ball.

As shown on the drawings:

In Figure 1, the reference numeral 10 designates a joint housing having an externally threaded stem 10a for threaded insertion in a tie rod or the like, and an enlarged head 10b on the end of the stem. The head 10b has a cylindrical bore 10c extending from an apertured end wall 10d to a counterbore 10e. The cylindrical bore 10c provides the housing chamber.

A ball stud 11 has the ball end 11a thereof seated in the housing chamber. A reduced-diameter neck portion 11b extends from the housing chamber thru the aperture in the end wall 10d and diverges to the large end of a reverse tapered shank portion 11c. A cylindrical threaded end 11d extends from the small end of the tapered portion 11c. In operation, the portion 11c is seated into the tapered bore of a link arm such as a steering arm of an automotive vehicle. A nut (not shown) is threaded on the portion 11d to hold the tapered portion 11c in position.

A pair of rubber rings 12 and 13 are seated in the housing chamber. These rubber rings have recesses carrying, in vulcanized relation thereto, liners 14 and 15.

As shown in Figure 2, the rubber ring 12 has a cylindrical side wall 12a, a beveled top edge 12b, a flat top face 12c, and a flat bottom face 12d. An open-ended recess 12e in the ring converges from the bottom face 12d to the top face 12c and provides a restricted opening in the center of the top face.

The liner 14 is bonded to the wall of the recess 12e as by vulcanizing, cementing, or the like. This liner 14 is fabric material impregnated with thermosetting resin, and the entire unit of bearing ring 12 and liner 14 can be formed in a single heat-treating operation which will set the resin and vulcanize the rubber.

As also shown in Figure 2, the neck 11b of the stud 11 projects through the restricted opening in the ring 12 and the ball end 11a of the stud has the upper half portion thereof disposed in the ring 12. The ball end 11a has a radius R struck from a center C.

The liner 14 has a toroidal bearing face generated from the periphery of a circle C', the diameter of which is shown in Figure 2 by the line connecting the points C', C'. The circle C' lies in a flat horizontal plane perpendicular to the axis of the ball stud 11 and beneath the center point C for the radius R. A long radius R' centered on the circle C' is swung in a vertical plane and around the periphery of the circle C' from the side of the circle away from the surface being generated to generate the bearing face. Thus each increment of the surface of the bearing face of the liner is generated from a radius R' having its center on a different point of the periphery of the circle C'.

The resulting toroidal bearing surface of the liner 14 will only have a ring line contact at X with the spherical ball end 11a and spaces Y and Z will be provided between the ball end and the liner on each side of the ring line contact X.

The cylindrical wall 12a of the rubber ring 12 has a larger diameter than the cylindrical wall 10c of the housing 10b and, as shown in Figure 3, when the assembly of Figure 2 is inserted in the chamber of housing 10b, the rubber ring 12 is radially loaded. This radial loading of the rubber ring increases the ring line contact X between the liner and ball to a band contact X'. This band contact X' extends for about one-third the distance of the height of the liner, and spaces Y' and Z' on each side of the band area X' are therefore materially decreased in size from the original spaces X and Y.

The ring 12 in the housing 10b has the end face 12c thereof bottomed on the housing end wall 10d, and the radial loading of the ring somewhat bulges the beveled edge 12b of the ring into a curved contour not quite fully filling the corner of the housing between the side wall 10c and end wall 10d.

The bottom face 12d of the ring 12 is also somewhat deformed, and will bow downwardly from its original flat position as shown in Figure 3.

The original toroidal surface for the liner 14 is thus changed by radially loading the ring 12 in the housing 10b.

The rubber ring 12 and liner 14 is an exact duplicate of the ring 13 and liner 15, and parts of the ring 13 have been marked with the same reference characters used to identify like parts of the ring 12. As shown in Figure 4, the ring 13 is fitted around the lower half of the ball 11a and is inserted into the housing 10b so that its end face 13d will be bottomed on the end face 12d of the ring 12. The two liners 14 and 15 are thus placed in abutting relationship to cooperate for forming a ball socket open at the top and bottom thereof.

A closure disk 16 is seated in the counterbore 10e of the housing and forced against the end face 13c of the ring 13 until the disk is bottomed on the shoulder provided between the bore 10c and counterbore 10e. The housing is then spun over the peripheral margin of the closure disk as at 10f to secure the closure disk in position in the housing.

The closure disk axially loads both rings 12 and 13 and causes the spaces Y' and Z' of Figure 3 and similar spaces between the liner 15 and ball 11a to disappear. In other words, the axial loading of the already radially loaded rings 12 and 13 further deforms the liners 14 and 15 of these rings into full bearing engagement with the ball end 11a of the stud. The liners, in effect, are wrapped around the ball.

The axial loading of the rings 12 and 13 in the housing 10b causes the initially beveled edges of these rings to disappear, since rubber will flow into the corner at the ends of the bore 10c. Rubber will also flow from the flat end faces 12c and 13c to provide a bulged portion in the aperture of the end wall 10d and a second bulged portion in the sump S provided by a depressed central portion 16a of the closure disk.

The resulting socket for the ball 11a thus conforms with the spherical shape of the ball end, but this socket is sufficiently rigid so that it will not collapse when, for example, the flat end of the ball 11a is tilted into the socket and provides a space between the liner and ball.

The provision of toroidal bearing surfaces on the liners 14 and 15 makes it possible to vary the tolerances from basic sizes of the socket throughout a wider range than would be possible if the socket were designed to have fragmental spherical bearing walls. Radial and axial loading of such fragmental spherical walls would not permit this variation from basic sizes because the deformed spheres would not have good bearing contact with the entire end of the ball.

While toroidal contours are desired for the socket liners, it should be understood that other regularly curved surfaces lying between a straight conical surface and a true spherical surface could be used with a spherical ball end. Such regularly curved surfaces would initially have ring line contact with the ball end and could be deformed into full area contact with the ball end. The toroidal surface, however, makes possible a more accurate control of the position of the initial ring line contact with the ball so that it will lie substantially midway between the ends of the liners.

The ball of the completed joint assembly thus has two spaced parallel band area contacts between the ball and socket which are created by the radial load on the bushing ring. These band areas are increased in width by axially loading the rubber bushing.

The loaded rubber bushings hold the socket liners in position in the housing, and prevent "mushy" steering characteristics in a steering assembly, since material movement of the stud relative to the housing through interparticle flow of the rubber is prevented. In addition, since the rubber is at all times maintained under load, it will have a longer wearing life. The aperture of the end wall 10d and the sump S provide free spaces into which the loaded rubber can flow and form bulges. As wear occurs on the liners, the rubber, through interparticle flow, will take up the wear and the bulges will tend to flatten out.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A ball and socket joint comprising a stud having a ball end and a shank projecting therefrom, first and second rubber rings having thermoset synthetic resin impregnated fabric liners therein cooperating to define a ball socket for the ball end of the stud, said liners, in their free state, having a toroidal contour so that the liner of the first ring has only a ring line contact with the upper portion of the ball end of the stud while the second liner has only a ring line contact with the lower part of the ball when the rubber rings are disposed around the ball, a housing receiving said rings and ball and having a size smaller than the free state size of the rings to radially load the rings for increasing the ring line contact of the liners with the ball end of the stud into band area contact, and a closure plate secured in said housing thrusting against said rubber rings to axially load the rings and deform the liners into full bearing engagement with the ball end of the stud.

2. A ball and socket tie rod end comprising a stud having a ball end, a housing having a bore providing a chamber, a pair of fabric-lined rubber rings disposed around the ball end of the stud to respectively envelop the top and bottom halves of the ball end of the stud, said fabric liners of the rings having inner ball end receiving surfaces which are non-ball shaped in their free stage to engage the ball end only along opposed ring lines on opposite sides of the major diameter of the ball end and said rings having outside dimensions greater than the inside dimension of said bore of the housing to be deformed thereby and force the liners into fuller bearing relationship with the ball end of the stud.

3. A ball and socket joint comprising a ball stud having a ball end, a first rubber ring having a deformable liner vulcanized thereto seated around the top portion of the ball end of the stud, a second rubber ring having a deformable liner vulcanized thereto seated around the bottom portion of the ball end of the stud, said liners having inner walls which in their free stage only engage the ball end around circular lines on opposite sides of the major diameter of the ball end, a housing receiving said rings and radially loading the rings to deform the liners thereof, and a closure member for said housing axially loading the rings to further deform the liners into full bearing engagement with the ball end of the stud.

4. A ball and socket joint comprising a ball ended stud, a first rubber ring having a thermoset resin-impregnated fabric liner therein defining a localized ring seat intermediate its ends for the top portion of the ball end of the stud, a second rubber ring having a thermoset resin-impregnated fabric liner therein defining a localized ring seat intermediate its ends for the bottom of the ball end of the stud, and a housing and closure assembly radially and axially loading said rubber rings to deform the liners without damaging the therein contained resin into fuller bearing contact with the ball end of the stud.

5. A ball and socket joint comprising a ball ended stud, a pair of fabric-lined rubber rings cooperating in their free stage to define a ball socket for the ball end of the stud and engaging the ball end only along localized rings on opposite sides of the major diameter of the ball end, a thermoset synthetic resin impregnated into the fabric lining of said rings, and a housing and closure assembly receiving said rings and sized for axially and radially loading the same to deform the linings into full bearing relationship with the ball end of the stud.

6. A joint comprising a housing having a cylindrical bore therein and with an apertured end wall at one end thereof and a counterbore in the other end thereof, a first rubber bearing ring in said bore of the housing bottomed on said apertured end wall, a ball stud having a shank projecting through said ring and said apertured end wall of the housing together with a ball end seated in said ring, a second rubber ring in said bore of the housing receiving the lower half of the ball end of the stud, a synthetic resin-impregnated fabric liner in each of said rings, said liners in the unloaded rings having inner wall surfaces engaging only localized portions of the ball end on opposite sides of the major diameter of the ball end, and a closure member secured in said counterbore of the housing axially loading said rings to deform the fabric liners thereof into fuller bearing relation with the ball end of the stud.

JAMES H. BOOTH.

REFERENCES CITED

The following references are of record in the file of this patent:

UNITED STATES PATENTS

| Number | Name | Date |
| --- | --- | --- |
| 1,862,933 | Hufferd et al. | June 14, 1932 |
| 1,923,601 | Weaver | Aug. 22, 1933 |
| 1,989,116 | Strauss | Jan. 29, 1935 |
| 2,280,634 | Flumerfelt | Apr. 21, 1942 |
| 2,288,160 | Flumerfelt | June 30, 1942 |
| 2,361,025 | Graham et al. | Oct. 24, 1944 |
| 941,605 | Baekeland | Nov. 30, 1909 |